(12) United States Patent
Moore et al.

(10) Patent No.: US 8,357,540 B2
(45) Date of Patent: Jan. 22, 2013

(54) POLYMERIC SUBSTRATES WITH FLUOROALKOXYCARBONYL GROUPS FOR AMINE CAPTURE

(75) Inventors: George G. I. Moore, Afton, MN (US); Charles M. Leir, Falcon Heights, MN (US); Rahul R. Shah, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 777 days.

(21) Appl. No.: 11/856,144

(22) Filed: Sep. 17, 2007

(65) Prior Publication Data

US 2008/0153175 A1   Jun. 26, 2008

Related U.S. Application Data

(60) Provisional application No. 60/871,294, filed on Dec. 21, 2006.

(51) Int. Cl.
   *G01N 33/00* (2006.01)
(52) U.S. Cl. .......................... 436/111; 435/6.1
(58) Field of Classification Search ............. 436/111; 435/6.1
   See application file for complete search history.

(56) References Cited

U.S. PATENT DOCUMENTS

| | | | |
|---|---|---|---|
| 2,862,893 A | 12/1958 | Hwa | |
| 3,719,698 A | 3/1973 | Tesoro et al. | |
| 4,035,316 A | 7/1977 | Yen et al. | |
| 4,837,289 A * | 6/1989 | Mueller et al. | 526/279 |
| 5,380,784 A | 1/1995 | Usuki | |
| 5,494,961 A | 2/1996 | Lavoie | |
| 5,494,975 A | 2/1996 | Lavoie | |
| 5,525,662 A | 6/1996 | Lavoie | |
| 5,548,024 A | 8/1996 | Lavoie | |
| 5,616,764 A | 4/1997 | Lavoie | |
| 5,627,259 A * | 5/1997 | Thaler et al. | 528/342 |
| 6,513,897 B2 | 2/2003 | Tokie | |
| 6,696,157 B1 | 2/2004 | David et al. | |
| 6,765,036 B2 | 7/2004 | Dede et al. | |
| 6,883,908 B2 | 4/2005 | Young et al. | |
| 6,897,164 B2 | 5/2005 | Baude et al. | |
| 6,897,262 B2 | 5/2005 | Pears | |
| 7,544,754 B2 | 6/2009 | Leir | |
| 7,632,903 B2 | 12/2009 | Leir | |
| 2005/0070627 A1 | 3/2005 | Falsafi et al. | |
| 2005/0106709 A1 | 5/2005 | Benson et al. | |
| 2005/0113477 A1 | 5/2005 | Oxman et al. | |
| 2008/0227169 A1 | 9/2008 | Benson | |

FOREIGN PATENT DOCUMENTS

| | | |
|---|---|---|
| EP | 0816310 | 1/1998 |
| EP | 0818431 | 1/1998 |
| JP | 63278913 | 11/1988 |
| JP | 04-272903 | 9/1992 |
| JP | 07-138317 | 5/1995 |
| JP | 10-081649 | 3/1998 |
| JP | 10-120631 | 5/1998 |
| JP | 2004-501247 | 1/2004 |
| JP | 2009/516008 | 4/2009 |
| JP | 2010-513930 | 4/2010 |
| WO | WO 2005/066121 | 7/2005 |

OTHER PUBLICATIONS

Albericio Fernando et al, "A New Strategy for Solid-Phase Depsipeptide Synthesis Using Recoverable Building Blocks", Organic Letters, Feb. 17, 2005, vol. 7, No. 5, pp. 597-600, XP002501910, ISSN: 1523-7060.
Pittman, et al, "Polymers Derived from Fluoroketones", J. Polymer Sci. A, vol. 6, 1968, pp. 1741-1750, XP007906127, the whole document.
A.G. Pittman et al., *J Polymer Science* A-1, 4, 2637 (1966).
U.S. Appl. No. 11/856,140, filed Sep. 17, 2007; Titled: Surface-Bound Fluorinated Esters for Amine Capture.
Fryxell et al., Nucleophilic displacements in mixed self-assembled monolayers, *American Chemical Society*, 1996, vol. 12, No. 21, pp. 5064-5075.
Margel et al., Peptide, protein, and cellular interactions with self-assembled monolayer model surfaces, *Journal of Biomedical Materials Research*, 1993, vol. 27, pp. 1463-1476.

* cited by examiner

*Primary Examiner* — Michael Marcheschi
*Assistant Examiner* — Jonathan Hurst
(74) *Attorney, Agent, or Firm* — Jean A. Lown

(57) ABSTRACT

Amino-containing materials can be attached to polymeric materials having a pendant amine capture group that includes a fluoroalkoxycarbonyl group. An amino-containing material can react with the pendant amine capture group by a nucleophilic substitution reaction. The product of the reaction is an alcohol and a pendant group that contains a carbonylimino group. The reaction results in the connection of the amino-containing material to the polymeric material. The polymeric materials are often disposed on a surface of a substrate and the connection of the amino-containing material to the polymeric material results in the immobilization of the amino-containing material on the substrate.

18 Claims, No Drawings

POLYMERIC SUBSTRATES WITH FLUOROALKOXYCARBONYL GROUPS FOR AMINE CAPTURE

PRIORITY CLAIM

This application claims priority to U.S. Provisional Patent Application Ser. No. 60/871,294 filed on Dec. 21, 2006, the disclosure of which is incorporated herein by reference.

TECHNICAL FIELD

Methods of connecting amino-containing material to a polymeric material and immobilizing an amino-containing material on a substrate are described.

BACKGROUND

Amino-containing materials such as amino-containing analytes, amino acids, DNA, RNA, proteins, cells, tissue, organelles, immunoglobins, or fragments thereof immobilized on a surface of a substrate can be used in numerous applications. For example, immobilized biological amino-containing materials can be used for the medical diagnosis of a disease or genetic defect, for biological separations, or for detection of various biomolecules. Immobilization of the amino-containing material is typically accomplished by reaction of the amino group with a reactive functional group that is covalently attached to the surface of the substrate.

Substrates having amino-reactive functional groups can be prepared by coating a substrate with a solution of a polymeric material that contains amino-reactive functional groups. Alternatively, substrates having amino-reactive functional groups can be prepared by coating a substrate with a solution of monomers that contain amine reactive functional groups followed by polymerization of the monomers. Exemplary amino-reactive monomers include, for example, N-[(meth)acryloxy]succinimide and vinyl azlactone. An amino-containing material can react with the N-acyloxysuccinimide group resulting in displacement of N-hydroxysuccinimide and formation of a carboxamide. An amino-containing material can react with the cyclic azlactone resulting in an opening of the ring structure.

Although polymeric surfaces that include a reactive functional group such as an N-acyloxysuccinimide group or an azlactone group can react readily with primary or secondary amino-containing materials, such reactive functional groups can suffer from a number of disadvantages. For example, many of the reactions with biological amino-containing materials are conducted in dilute aqueous solutions. Under these conditions, the N-acyloxysuccinimide functional group is known to undergo rapid hydrolysis. This competing reaction can cause incomplete or inefficient immobilization of the amino-containing materials on the substrate.

While azlactone functional groups are more stable to hydrolysis, it is difficult to synthesize an azlactone linked to any polymerizable group other than a vinyl group. The resulting polymeric material has amino-reactive functional groups directly attached to the polymer backbone. In some applications, this can make it difficult for the amino-containing material to get close enough to the amine reactive group for efficient immobilization.

SUMMARY

Methods of connecting an amino-containing material to a polymeric material and immobilizing an amino-containing material on a substrate are described. More specifically, the amino-containing material can be attached to a polymeric material that contains a pendant amine capture group. The pendant amine capture group contains a fluoroalkoxycarbonyl group that can undergo a nucleophilic substitution reaction with a primary or secondary amino-containing material. A partially reacted polymeric material is described that contains both reacted and unreacted pendant amine capture groups. Articles containing the partially reacted polymeric material are also described.

In one aspect, a method of connecting an amino-containing material to a polymeric material is described. The method includes providing a polymeric material containing a pendant amine capture group of Formula I that includes a fluoroalkoxycarbonyl group.

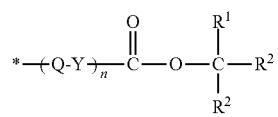

In Formula I, the variable n is equal to 0 or 1. Group Q is either a carbonyloxy or carbonylimino. Group Y is a divalent group containing an alkylene, heteroalkylene, arylene, or combination thereof and optionally further containing a carbonyl, carbonyloxy, carbonylimino, oxy, —$NR^3$—, or combination thereof. Group $R^1$ is selected from hydrogen, fluoro, alkyl, or a lower fluoroalkyl; each $R^2$ is a lower fluoroalkyl; and $R^3$ is selected from hydrogen, alkyl, aryl, or aralkyl. An asterisk (*) denotes an attachment site of the pendant amine capture group to a backbone of the polymeric material. The method further includes reacting (1) a primary or secondary amino-containing material and (2) the fluoroalkoxycarbonyl group of the pendant amine capture group resulting in connection of the amino-containing material to the polymeric material.

In another aspect, a method of immobilizing an amino-containing material to a substrate is described. The method includes providing a substrate and disposing a polymeric material on a surface of the substrate, wherein the polymeric material has pendant amine capture group of Formula I

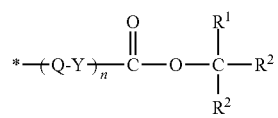

that contains a fluoroalkoxycarbonyl group. The method further includes reacting (1) a primary or secondary amino-containing material and (2) the fluoroalkoxycarbonyl group of the pendant amine capture group resulting in connection of the amino-containing group to the polymeric material. The variable n as well as the groups Q, Y, $R^1$, and $R^2$ are the same as defined above for Formula I.

In another aspect, a method of immobilizing an amino-containing material to a substrate is described. The method includes providing a substrate and disposing a reaction mixture on a surface of the substrate. The reaction mixture contains (a) an amine capture monomer of Formula II

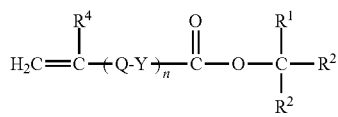

that includes a fluoroalkoxycarbonyl group and (b) a crosslinking monomer that includes at least two (meth)acryloyl groups. In Formula II, the variable n is equal to 0 or 1. Group Q is either a carbonyloxy or carbonylimino. Group Y is a divalent group containing an alkylene, heteroalkylene, arylene, or combination thereof and optionally further containing a carbonyl, carbonyloxy, carbonylimino, oxy, —$NR^3$—, or combination thereof. Group $R^1$ is selected from hydrogen, fluoro, alkyl, or lower fluoroalkyl; each $R^2$ is a lower fluoroalkyl; $R^3$ is selected from hydrogen, alkyl, aryl, or aralkyl; and $R^4$ is hydrogen or alkyl. The method further includes curing the reaction mixture to form a crosslinked polymeric material having a pendant amine capture group. The method still further includes reacting (1) a primary or secondary amino-containing material and (2) the fluoroalkoxycarbonyl group of the pendant amine capture group resulting in connection of the amino-containing material to the polymeric material.

In yet another aspect, a partially reacted polymeric material is described. The polymeric material includes (a) a first pendant amine capture group of Formula I that contains a fluoroalkoxycarbonyl group and (b) a carbonylimino-containing pendant group that is the reaction product of a second pendant amine capture group of Formula I with a primary amino-containing material or a secondary amino-containing material.

In still another aspect, an article is described. The article includes a substrate and a polymeric material disposed on a surface of the substrate. The polymeric material includes (a) a first pendant amine capture group of Formula I that contains a fluoroalkoxycarbonyl group and (b) a carbonylimino-containing pendant group that is the reaction product of a second pendant amine capture group of Formula I with a primary amino-containing material or a secondary amino-containing material.

The terms "a", "an", and "the" are used interchangeably with "at least one" to mean one or more of the elements being described.

The term "alkoxy" refers to a monovalent group of formula —OR where R is an alkyl group.

The term "alkoxycarbonyl" refers to a monovalent group of formula —(CO)OR where R is an alkyl group.

The term "alkyl" refers to a monovalent group that is a radical of an alkane and includes groups that are linear, branched, cyclic, or combination thereof. The alkyl group typically has 1 to 30 carbon atoms. In some embodiments, the alkyl group contains 1 to 20 carbon atoms, 1 to 10 carbon atoms, 1 to 6 carbon atoms, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combination thereof. The alkylene typically has 1 to 200 carbon atoms. In some embodiments, the alkylene contains 1 to 100, 1 to 80, 1 to 50, 1 to 30, 1 to 20, 1 to 10, or 1 to 4 carbon atoms. The radical centers of the alkylene can be on the same carbon atom (i.e., an alkylidene) or on different carbon atoms.

The term "aralkyl" refers to a monovalent group that is a radical of the compound R—Ar where Ar is an aromatic carbocyclic group and R is an alkyl group.

The term "aryl" refers to a monovalent group that is a radical of a carbocyclic aromatic compound. The aryl can have one aromatic ring or can include up to 5 other carbocyclic rings that are connected to or fused to the aromatic ring. The other carbocyclic rings can be aromatic, non-aromatic, or combination thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is a radical of a carbocyclic aromatic compound. The arylene can have one aromatic ring or can include up to 5 other carbocyclic rings that are connected to or fused to the aromatic ring. The other carbocyclic rings can be aromatic, non-aromatic, or combination thereof. Exemplary arylene groups have 1, 2, or 3 aromatic rings. For example, the arylene group can be phenylene.

The term "carbonyl" refers to a divalent group of formula —(CO)—.

The term "carbonylimino" refers to a divalent group of formula —(CO)$NR^a$— where $R^a$ is hydrogen, alkyl, aryl, or aralkyl.

The term "carbonyloxy" refers to a divalent group of formula —(CO)O—.

The term "carboxy" refers to a monovalent group of formula —(CO)OH.

The term "fluoroalkyl" refers to an alkyl having at least one hydrogen atom replaced with a fluorine atom. As used herein, the term "lower fluoroalkyl" refers to a fluoroalkyl having 1, 2, 3, or 4 carbon atoms. Some exemplary fluoroalkyls have one carbon atom such as —$CHF_2$ or —$CF_3$.

The term "fluoroalkoxy" refers to a monovalent group of formula —$OR^f$ where $R^f$ refers to a fluoroalkyl.

The term "fluoroalkoxycarbonyl" refers to a monovalent group of formula —(CO)$OR^f$ where (CO) refers to a carbonyl group and $R^f$ refers to a fluoroalkyl group. The fluoroalkoxycarbonyl is usually of formula —(CO)$OCR^1(R^2)_2$ where $R^1$ and $R^2$ are defined herein.

The term "heteroalkylene" refers to a divalent group that is an alkylene having one or more carbon atoms replaced with a sulfur, oxygen, or —$NR^b$— where $R^b$ is hydrogen or alkyl. The heteroalkylene can be linear, branched, cyclic, or combination thereof and can include up to 400 carbon atoms and up to 30 heteroatoms. In some embodiments, the heteroalkylene includes up to 300 carbon atoms, up to 200 carbon atoms, up to 100 carbon atoms, up to 50 carbon atoms, up to 30 carbon atoms, up to 20 carbon atoms, or up to 10 carbon atoms.

The term "(meth)acrylate" refers to a monomer that is an acrylate or methacrylate. Likewise, the term "(meth)acrylamide" refers to a monomer that is an acrylamide or methacrylamide.

The term "(meth)acryloyl" refers to an ethylenically unsaturated group of formula $CH_2$=$CR^4$—(CO)— where $R^4$ is hydrogen or methyl. The (meth)acryloyl group is typically adjacent to an oxy or —$NR^c$— group where $R^c$ is hydrogen, alkyl, aryl, or aralkyl.

The term "oxy" refers to a divalent group of formula —O—.

The term "thio" refers to a divalent group of formula —S—.

The term "amine capture monomer" refers to a monomer having an amine capture group. The term "amine capture group" refers to a group on a monomer or polymer that is capable of reacting with an amino-containing material. The amine capture group often contains a fluoroalkoxycarbonyl group.

The term "amino-containing material" refers to a material that has a primary amino group or a secondary amino group. The amino-containing material can be a biological material or a non-biological material. The amino-containing material often has an alkylene group bonded to the primary amino group or secondary amino group.

The term "pendant" refers to a group that is attached to the backbone of a polymeric material but that is not part of the backbone of the polymeric material. The pendant group is not involved in the polymerization reaction.

The terms "polymer" and "polymeric material" are used interchangeably to refer to both materials prepared from one monomer such as a homopolymer or to materials prepared from two or more monomers such as a copolymer, terpolymers, or the like. Likewise, the term "polymerize" refers to the process of making a polymeric material that can be a homopolymer, copolymer, terpolymer, or the like.

The term "room temperature" refers to a temperature of about 20° C. to about 25° C. or about 22° C. to about 25° C.

The term "substrate" refers to a solid phase support. The substrates can have any useful form including, but not limited to, thin films, sheets, membranes, filters, nonwoven or woven fibers, hollow or solid beads, bottles, plates, tubes, rods, pipes, or wafers. The substrates can be porous or non-porous, rigid or flexible, transparent or opaque, clear or colored, and reflective or non-reflective. Suitable substrate materials include, for example, polymeric materials, glasses, ceramics, metals, metal oxides, hydrated metal oxides, or combination thereof.

The above summary is not intended to describe each disclosed embodiment or every implementation of the present invention. The description that follows more particularly exemplifies illustrative embodiments. In several places throughout this document, guidance is provided through lists of examples, which can be used in various combinations. In each instance, the recited list serves only as a representative group and should not be interpreted as an exclusive list.

DETAILED DESCRIPTION

Amino-containing materials can be connected to polymeric materials having a pendant amine capture group. More specifically, the pendant amine capture group contains a fluoroalkoxycarbonyl group that can react with a primary or secondary amino-containing material by a nucleophilic substitution reaction. The product of the reaction is an alcohol and a pendant group that contains a carbonylimino group. The reaction results in the connection of the amino-containing material to the polymeric material. The polymeric materials are often disposed on a surface of a substrate and the connection of the amino-containing material to the polymeric material results in the immobilization of the amino-containing material on the substrate.

In one aspect, a method of connecting an amino-containing material to a polymeric material is described. The method includes providing a polymeric material containing a pendant amine capture group of Formula I that includes a fluoroalkoxycarbonyl group.

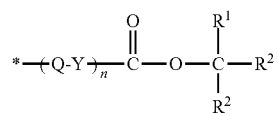

In Formula I, the variable n is equal to 0 or 1. Group Q is a carbonyloxy or carbonylimino. Group Y is a divalent group containing an alkylene, heteroalkylene, arylene, or combination thereof and optionally further containing a carbonyl, carbonyloxy, carbonylimino, oxy, $-NR^3-$, or combination thereof. Group $R^1$ is selected from hydrogen, fluoro, alkyl, or lower fluoroalkyl; $R^2$ is a lower fluoroalkyl; and $R^3$ is selected from hydrogen, alkyl, aryl, or aralkyl. An asterisk (*) denotes an attachment site of the pendant group to a backbone of the polymeric material. The method further includes reacting a primary or secondary amino-containing material with the fluoroalkoxycarbonyl group of the pendant amine capture group resulting in the connection of the amino-containing group to the polymeric material. The reaction results in the nucleophilic displacement of an alcohol of formula $HO-CR^1(R^2)_2$ and the formation of a pendant group containing a carbonylimino group.

The pendant amine capture group of the polymeric material is typically connected to a hydrocarbon polymeric backbone. The polymeric material is typically the reaction product of free radical polymerization of a reaction mixture that contains an amine capture monomer. The amine capture monomer has both an ethylenically unsaturated group and an amine capture group. These amine capture monomer is typically of Formula II.

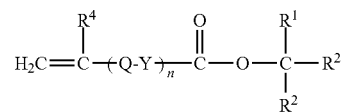

In Formula II, the variable n, Q, Y, $R^1$, and $R^2$ are the same as defined for Formula I. Group $R^4$ is selected from hydrogen or alkyl. In many embodiments, $R^4$ is hydrogen or methyl.

When the variable n is equal to 0, the amine capture monomer of Formula II is of Formula IIa

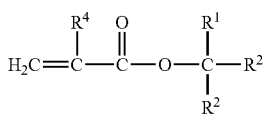

and the resulting polymeric material contains a pendant amine capture group of Formula Ia.

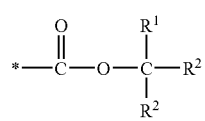

When the variable n is equal to 1, the amine capture monomer of Formula II is of Formula IIb

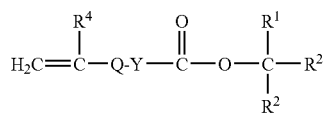

and the resulting polymeric material contains a pendant amine capture group of Formula Ib.

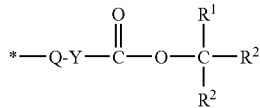

A polymeric material having a pendant group of Formula Ib has a spacer group (i.e., -Q-Y—) between the backbone of the polymeric material and the amine capture group (i.e., fluoroalkoxycarbonyl group).

The pendant amine capture group of Formula I and the amine capture monomer of Formula II both contain a fluoroalkoxycarbonyl group of formula —(CO)OCR$^1$(R$^2$)$_2$ where R$^1$ is selected from hydrogen, fluoro, alkyl, or lower fluoroalkyl; and each R$^2$ is selected from a lower fluoroalkyl. Suitable alkyl groups for R$^1$ typically have 1 to 10, 1 to 6, or 1 to 4 carbon atoms. Suitable lower fluoroalkyl groups for R$^1$ and R$^2$ typically have 1 to 4 carbon atoms. Some exemplary lower fluoroalkyl groups have one carbon atom such as —CHF$_2$ or —CF$_3$.

In some exemplary monomers and pendant groups, the fluoroalkoxycarbonyl group is of selected from —(CO)OCH(CF$_3$)$_2$ where R$^1$ is hydrogen and each R$^2$ is —CF$_3$ or —(CO)OC(CF$_3$)$_3$ where R$^1$ and each R$^2$ is —CF$_3$. In other exemplary monomers and pendant groups, the fluoroalkoxycarbonyl group is selected from —(CO)OCF(CF$_3$)$_2$ where R$^1$ is fluoro and R$^2$ is —CF$_3$.

Group Q is either a carbonyloxy group of formula —(CO)O— or a carbonylimino group of formula —(CO)—NR$^3$— where R$^3$ is selected from hydrogen, alkyl, aryl, or aralkyl. Suitable alkyl groups for R$^3$ often have 1 to 10, 1 to 6, or 1 to 4 carbon atoms. An exemplary aryl R$^3$ group is phenyl. An exemplary aralkyl R$^3$ group includes, but are not limited to, an alkyl having 1 to 10 carbon atoms substituted with a phenyl, an alkyl having 1 to 6 carbon atoms substituted with a phenyl, or an alkyl having 1 to 4 carbon atoms substituted with a phenyl.

Y is a divalent group that includes an alkylene, heteroalkylene, arylene, or combination thereof. Group Y can optionally further include a carbonyl, carbonyloxy, carbonylimino, oxy, thio, —NR$^3$—, or combination thereof. Group R$^3$ is selected from hydrogen, alkyl, aryl, or aralkyl. Group Y typically does not contain a peroxy (i.e., —O—O—) linkage.

In some embodiments, group Y can be an alkylene or group Y can include a first alkylene connected to at least one other group selected from a heteroalkylene, arylene, second alkylene, carbonyl, carbonyloxy, oxy, thio, —NR$^3$—, or combination thereof. In other embodiments, group Y can be a heteroalkylene or group Y can include a first heteroalkylene connected to at least one other group selected from an arylene, alkylene, second heteroalkylene, carbonyl, carbonyloxy, oxy, thio, —NR$^3$—, or combination thereof. In still other embodiments, group Y can be an arylene or group Y can include a first arylene connected to at least one other group selected from an alkylene, heteroalkylene, second arylene, carbonyl, carbonyloxy, oxy, thio, —NR$^3$—, or combination thereof.

Some exemplary pendant amine capture groups, as shown in Formula Ic, have an alkylene Y group.

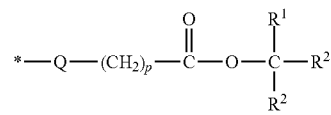

In Formula Ic, the variable p is an integer of 1 to 20. Exemplary compounds include those were p is an integer no greater than 15, no greater than 10, no greater than 8, no greater than 6, no greater than 4, no greater than 3, or no greater than 2. Such a pendant group can be provided, for example, from the free radical polymerization of a reaction mixture that contains an amine capture monomer of Formula IIc.

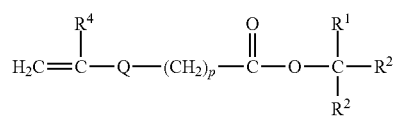

Groups R$^1$, R$^2$, and R$^4$ are the same as previously described for Formulas I and II.

Other exemplary pendant amine capture groups, as shown in Formulas Id or Ie can have a heteroalkylene Y group.

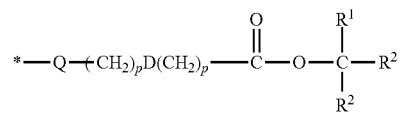

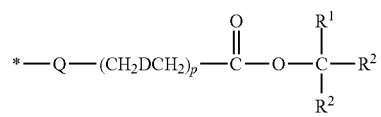

In Formula Id and Ie, each variable p is independently an integer of 1 to 20 and D is oxy, thio, or —NH—. Exemplary compounds include those were p is an integer no greater than 15, no greater than 10, no greater than 8, no greater than 6, no greater than 4, no greater than 3, or no greater than 2. Such pendant groups can be provided, for example, from the free radical polymerization of a reaction mixture that contains an amine capture monomer of Formulas IId or IIe.

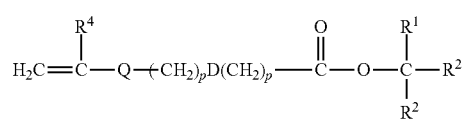

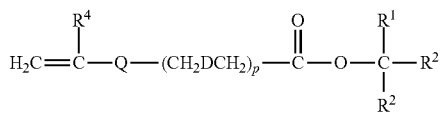
IIe

Groups $R^1$, $R^2$, and $R^4$ are the same as previously described for Formulas I and II.

In other exemplary pendant amine capture group of Formula I, Y includes a first alkylene that is linked to a second alkylene or to a first heteroalkylene group with a group selected from a carbonyl, carbonyloxy, carbonylimino, oxy, thio, or —$NR^3$—. Additional alkylene or heteroalkylene groups can be linked to the second alkylene or to the first heteroalkylene group with a group selected from a carbonyl, carbonyloxy, carbonylimino, oxy, thio, or —$NR^3$—. In still other exemplary pendant amine capture groups of Formula I, Y includes a first heteroalkylene that is linked to a second heteroalkylene or to a first alkylene group with a group selected from a carbonyl, carbonyloxy, carbonylimino, oxy, thio, or —$NR^3$—. Additional alkylene or heteroalkylene groups can be linked to the second heteroalkylene or to the first alkylene group with a group selected from a carbonyl, carbonyloxy, carbonylimino, oxy, thio, or —$NR^3$—.

For instance, the pendant amine capture group can be of Formula If, Ig, or Ih.

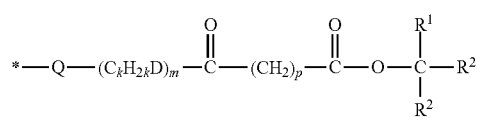
If

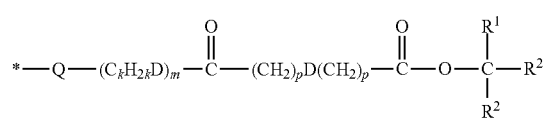
Ig

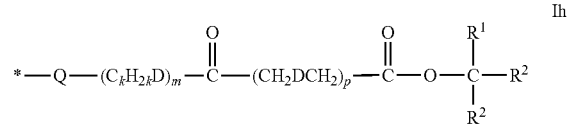
Ih

In Formula If, Ig, and Ih, each D is independently oxy, thio, or —NH—; m is an integer of 1 to 15; k is an integer of 2 to 4; and p is an integer of 1 to 20. Exemplary compounds include those were p is an integer no greater than 15, no greater than 10, no greater than 8, no greater than 6, no greater than 4, no greater than 3, or no greater than 2 with m being no greater than 10, no greater than 5, no greater than 2, or no greater than 1. Such pendant amine capture groups can be provided, for example, from the free radical polymerization of a reaction mixture that contains an amine capture monomer of Formula IIf, IIg, or IIh.

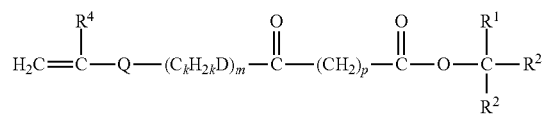
IIf

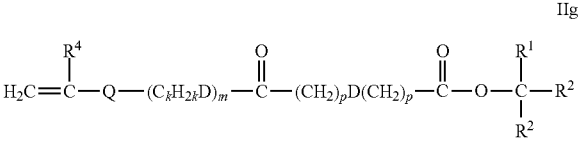
IIg

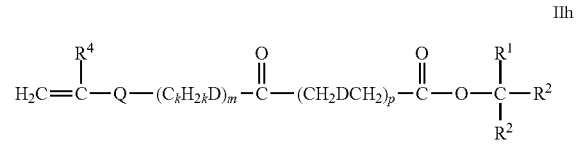
IIh

Groups $R^1$, $R^2$, and $R^4$ are the same as previously described for Formulas I and II. In many such pendant amine capture groups, k is equal to 2, D is oxy, m is equal to 1, and p is no greater than 3.

Several factors can influence the selection of group Y for a particular application. These factors include, for example, ease of synthesis of the amine capture monomer, compatibility or reactivity of the amine capture monomer with a crosslinking monomer when one is present, and reactivity or selectivity of the amine capture group with an amino-containing material. For example, the size and polarity of group Y can affect the reactivity of the amine capture group with an amino-containing material. That is, the reactivity of the amine capture group can be altered by varying the length of group Y, the composition of group Y, or both. Likewise, the size and nature of the amine capture group can influence the surface concentration and reactivity with the amino-containing material. The various groups in the amine capture monomer can be chosen, if desired, to provide a monomer that is liquid at ambient conditions. Liquid monomers tend to be useful in solventless coating compositions, which can be environmentally desirable.

Exemplary pendant amine capture groups include, but are not limited to,

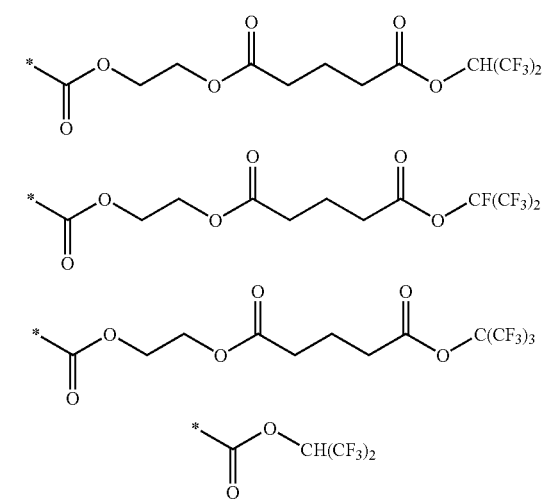

Polymers with these pendant amine capture groups can be prepared from the free radical polymerization of a reaction mixture that contains, respectively, the following amine capture monomers.

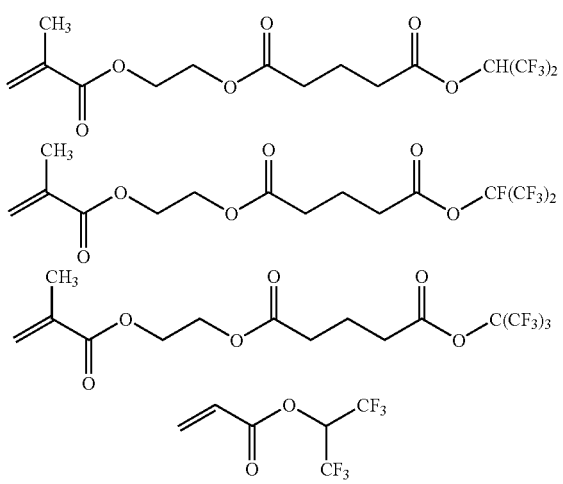

Any method known in the art can be used to prepare the monomers of Formula II. For example, some of the monomers can be prepared by reacting a hydroxy substituted (meth)acrylate ester with a cyclic anhydride. This reaction results in the formation of a (meth)acrylate ester having a carboxy group. The carboxy group can be reacted with thionyl chloride to form a (meth)acrylate ester having a halocarbonyl group. The halocarbonyl groups can then be reacted with an alcohol of formula $HOCR_1(R_2)_2$ in the presence of an acid acceptor where $R^1$ and $R^2$ are defined above. Alternatively, the halocarbonyl groups can be reacted with a $(R^2)_2CFO^-K^+$, which is that adduct of KF and a perfluoroketone formed in situ. Analogous conversions are reported in the literature for acryloyl chloride to generate compounds of Formula II where n is equal to zero.

The polymeric material containing pendant amine capture groups of Formula I can be linear, soluble polymers or can be insoluble, crosslinked polymers. When referring to polymeric material, the term "soluble" means that the polymeric material is soluble at room temperature in an amount of at least 0.01 weight percent in water or at least one organic solvent. Similarly, when referring to polymeric material, the term "insoluble" means that the polymeric material is not soluble at room temperature in an amount of at least 0.01 weight percent in water or at least one organic solvent. Exemplary organic solvents include, but are not limited to, alcohols (e.g., methanol, ethanol, 1-propanol, 2-propanol, 2-methyl-2-propanol, 1-butanol, and 2-butanol), nitriles (e.g., acetonitrile), alkanes (e.g., cyclohexane or hexane), ethers (e.g., tetrahydrofuran and fluorinated ethers such as hydrofluoroethers and hydrochlorofluoroethers), ketones (e.g., acetone, methyl ethyl ketone, methyl isobutyl ketone, or N-methylpyrrolidone), aromatic compounds (e.g., benzene, toluene, or xylene), esters (e.g., ethyl acetate), chlorinated hydrocarbons (e.g., chlorine-substituted alkanes), fluorinated hydrocarbons (e.g., fluorine-substituted alkanes), or combination thereof.

A linear, soluble polymeric material is typically synthesized in the absence of a crosslinking agent. That is, to prepare a linear, soluble polymeric material, the reaction mixture containing the amine capture monomer typically does not contain a crosslinking agent. The reaction mixture used to prepare such a polymeric material often contains 0.1 to 100 weight percent of the amine capture monomer of Formula II based on the weight of monomers in the monomer mixture.

In contrast, an insoluble, crosslinked polymeric material is typically polymerized in the presence of a crosslinking agent. That is, to prepare an insoluble, crosslinked polymeric material, the reaction mixture containing the amine capture monomer typically also contains a crosslinking agent having at least two (meth)acryloyl groups. If a crosslinked polymeric material is prepared, the reaction mixture often contains 0.1 to 90 weight percent of the amine capture monomer of Formula II and 10 to 99.9 weight percent of a crosslinking monomer based on the weight of the monomers in the monomer mixture.

Suitable crosslinking monomers for the preparation of insoluble, crosslinked polymeric materials include di(meth)acrylates, tri(meth)acrylates, tetra(meth)acrylates, penta(meth)acrylates, and the like. These (meth)acrylates can be formed, for example, by reacting (meth)acrylic acid with an alkanediol (i.e., an alkane substituted with two hydroxy groups), alkanetriol (i.e., an alkane substituted with three hydroxy groups), alkanetetra-ol (i.e., an alkane substituted with four hydroxy groups), or alkanepenta-ol (i.e., an alkane substituted with five hydroxy groups).

Exemplary crosslinking monomers include 1,2-ethanediol di(meth)acrylate; 1,12-dodecanediol di(meth)acrylate; 1,4 butanediol di(meth)acrylate; 1,6-hexanediol di(meth)acrylate; trimethylolpropane triacrylate (e.g., commercially available under the trade designation TMPTA-N from Surface Specialties, Smyrna, Ga. and under the trade designation SR-351 from Sartomer, Exton, Pa.); pentaerythritol triacrylate (e.g., commercially available under the trade designation SR-444 from Sartomer); tris(2-hydroxyethylisocyanurate) triacrylate (commercially available under the trade designation SR-368 from Sartomer); a mixture of pentaerythritol triacrylate and pentaerythritol tetraacrylate (e.g., commercially available from Surface Specialties under the trade designation PETIA with an approximately 1:1 ratio of tetraacrylate to triacrylate and under the trade designation PETA-K with an approximately 3:1 ratio of tetraacrylate to triacrylate); pentaerythritol tetraacrylate (e.g., commercially available under the trade designation SR-295 from Sartomer); di-trimethylolpropane tetraacrylate (e.g., commercially available under the trade designation SR-355 from Sartomer); ethoxylated pentaerythritol tetraacrylate (e.g., commercially available under the trade designation SR-494 from Sartomer); and dipentaerythritol pentaacrylate (e.g., commercially available under the trade designation SR-399 from Sartomer). Mixtures of crosslinking monomers can be used.

Other monomers such as optional diluent monomers can be included in the reaction mixture that is used to prepare either a linear, soluble polymeric material or a crosslinked, insoluble polymeric material. Suitable diluent monomers typically are (meth)acrylates or (meth)acrylamides that contain only one (meth)acryloyl group and that do not contain an amine capture group.

Some exemplary (meth)acrylate diluent monomers are alkyl(meth)acrylates such as methyl(meth)acrylate, ethyl (meth)acrylate, n-propyl(meth)acrylate, isopropyl (meth)acrylate, n-butyl(meth)acrylate, isobutyl(meth)acrylate, tert-butyl methacrylate, n-hexyl (meth)acrylate, cyclohexyl (meth)acrylate, 3,3,5-trimethylcyclohexyl (meth)acrylate, 2-methylbutyl(meth)acrylate, 2-ethylhexyl(meth)acrylate, 4-methyl-2-pentyl(meth)acrylate, n-octyl(meth)acrylate, isooctyl(meth)acrylate, n-decyl (meth)acrylate, isodecyl (meth)acrylate, lauryl(meth)acrylate, isononyl(meth)acrylate, isotridecyl(meth)acrylate, and behenyl(meth)acrylate.

Other exemplary (meth)acrylate diluent monomers are aryl (meth)acrylates such as phenyl(meth)acrylate, stearyl(meth)acrylate, and benzyl(meth)acrylate. Still other exemplary (meth)acrylate diluent monomers are hydroxy alkyl(meth) acrylates such as 2-hydroxyethyl(meth)acrylate and 3-hydroxypropyl(meth)acrylate, 4-hydroxybutyl (meth)acrylate, glycerol (meth)acrylate, and the like. Additional exemplary (meth)acrylate diluent monomers are ether-containing (meth) acrylates such as 2-ethoxyethyl(meth)acrylate, 2-methoxyethyl(meth)acrylate, polyethyleneglycol (meth)acrylate, and the like. The diluent monomers can be nitrogen-containing (meth)acrylates such as N,N-dimethylaminoethyl(meth) acrylate, N,N-dimethylaminopropyl (meth)acrylate, 2-trimethylammoniumethyl(meth)acrylate halides, and the like. The diluent monomers also can be (meth)acrylamides, N,N-dialkyl (meth)acrylamides, and the like.

Some reaction mixtures contain a solvent. Suitable solvents include, but are not limited to, water, alcohols (e.g., methanol, ethanol, 1-propanol, 2-propanol, 2-methyl-2-propanol, 1-butanol, and 2-butanol), nitriles (e.g., acetonitrile), alkanes (e.g., cyclohexane or hexane), ethers (e.g., tetrahydrofuran and fluorinated ethers such as hydrofluoroethers and hydrochlorofluoroethers), ketones (e.g., acetone, methyl ethyl ketone, methyl isobutyl ketone, and N-methylpyrrolidone), aromatic compounds (e.g., benzene, toluene, or xylene), esters (e.g., ethyl acetate), chlorinated hydrocarbons (e.g., chlorine-substituted alkanes), fluorinated hydrocarbons (e.g., fluorine-substituted alkanes), or combination thereof. Other reaction mixtures can be solventless. Exemplary solventless reaction mixtures include those in which the amine capture monomer is a liquid or those in which the reaction mixture is a coated composition with the solvent removed.

The reaction mixtures are typically polymerized using a free radical polymerization method. There is often an initiator included in the reaction mixture. The initiator can be a thermal initiator, a photoinitiator, or both. The initiator is often used at a concentration of 0.1 to 5 weight percent, 0.1 to 3 weight percent, 0.1 to 2 weight percent, or 0.1 to 1 weight percent based on the weight of monomers in the reaction mixture.

When a thermal initiator is added to the reaction mixture, the crosslinked polymer can be formed at room temperature (i.e., 20 to 25 degrees Celsius) or at an elevated temperature. The temperature needed for polymerization often depends on the particular thermal initiator used. Examples of thermal initiators include organic peroxides or azo compounds. Azo compounds are commercially available from DuPont (Wilmington, Del.) under the trade designation VAZO such as, for example, VAZO 67.

When a photoinitiator is added to the reaction mixture, a crosslinked polymeric material can be formed by the application of actinic radiation until the composition gels or hardens. Suitable actinic radiation includes electromagnetic radiation in the infrared region, visible region, ultraviolet region, or combination thereof.

Examples of photoinitiators suitable in the ultraviolet region include, but are not limited to, benzoin, benzoin alkyl ethers (e.g., benzoin methyl ether and substituted benzoin alkyl ethers such anisoin methyl ether), phenones (e.g., substituted acetophenones such as 2,2-dimethoxy-2-phenylacetophenone and substituted alpha-ketols such as 2-methyl-2-hydroxypropiophenone), phosphine oxides, polymeric photoinitiators, and the like.

Commercially available photoinitiators include, but are not limited to, 2-hydroxy-2-methyl-1-phenyl-propane-1-one (e.g., commercially available under the trade designation IRGACURE 1173 from Ciba Specialty Chemicals), a mixture of 2,4,6-trimethylbenzoyl-diphenyl-phosphine oxide and 2-hydroxy-2-methyl-1-phenyl-propan-1-one (e.g., commercially available under the trade designation DAROCUR 4265 from Ciba Specialty Chemicals), 2,2-dimethoxy-1,2-diphenylethan-1-one (e.g., commercially available under the trade designation IRGACURE 651 from Ciba Specialty Chemicals), a mixture of bis(2,6-dimethoxybenzoyl)-2,4,4-trimethyl-pentylphosphine oxide and 1-hydroxy-cyclohexyl-phenyl-ketone (e.g., commercially available under the trade designation IRGACURE 1800 from Ciba Specialty Chemicals), a mixture of bis(2,6-dimethoxybenzoyl)-2,4,4-trimethyl-pentylphosphine oxide (e.g., commercially available under the trade designation IRGACURE 1700 from Ciba Specialty Chemicals), 2-methyl-1-[4-(methylthio)phenyl]-2-morpholinopropan-1-one (e.g., commercially available under the trade designation IRGACURE 907 from Ciba Specialty Chemicals), 1-hydroxy-cyclohexyl-phenyl-ketone (e.g., commercially available under the trade designation IRGACURE 184 from Ciba Specialty Chemicals), 2-benzyl-2-(dimethylamino)-1-[4-(4-morpholinyl)phenyl]-1-butanone (e.g., commercially available under the trade designation IRGACURE 369 from Ciba Specialty Chemicals), bis(2,4,6-trimethylbenzoyl)-phenylphosphine oxide (e.g., commercially available under the trade designation IRGACURE 819 from Ciba Specialty Chemicals), ethyl 2,4,6-trimethylbenzoyldiphenyl phosphinate (e.g., commercially available from BASF, Charlotte, N.C. under the trade designation LUCIRIN TPO-L), and 2,4,6-trimethylbenzoyldiphenylphosphine oxide (e.g., commercially available from BASF, Charlotte, N.C. under the trade designation LUCIRIN TPO).

Photoinitiators suitable for use in the visible region often include an electron donor, and electron acceptor such as an iodonium salt, and a visible light sensitizing compound such as an alpha di-ketone. Such photoinitiators are further described, for example, in U.S. Patent Publications 2005/0113477 A1 (Oxman et al.) and 2005/0070627 A1 (Falsafi et al.); and U.S. Pat. No. 6,765,036 B2 (Dede et al.), all incorporated herein by reference.

The resulting polymeric materials, which can be linear and soluble or crosslinked and insoluble, has a pendant amine capture group that includes a fluoroalkoxycarbonyl group. The fluoroalkoxycarbonyl group of the pendant amine capture group can undergo a nucleophilic substitution reaction with a primary amino-containing material or a secondary amino-containing material as shown in the following Reaction Scheme A.

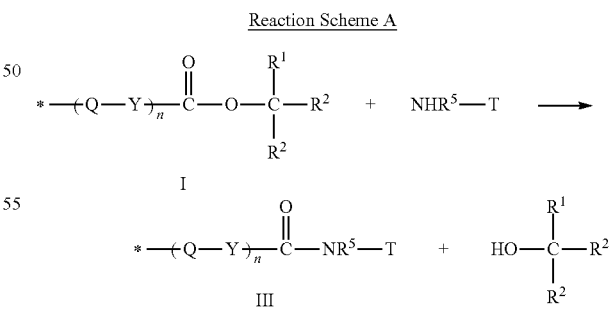

Reaction Scheme A

The products of the nucleophilic substitution reaction include an alcohol of formula $HO-CR^1(R^2)_2$ as well as a pendant group of Formula III. The pendant group of Formula III contains a carbonylimino group of formula $-(CO)-NR^5-$. The formation of the carbonylimino-containing pendant group of Formula III results in the connection of the amino-containing material to the polymeric material.

In Reaction Scheme A, NHR⁵-T represents the formula for a primary amino-containing material or a secondary amino-containing material. The group R⁵ is selected from hydrogen, alkyl, or a portion of a ring structure. Group T is equal to the remainder of the amino-containing material absent the amino group (—NHR⁵). The amino group is often bonded to an alkylene group in the amino-containing material. Suitable amino-containing materials that can be represented by the formula NHR⁵-T include, but are not limited to, amino-containing analytes, amino acids, DNA, RNA, proteins, cells, tissue, organelles, immunoglobins, or fragments thereof.

If an amino-containing material has a plurality of primary amino groups, secondary amino groups, or combination thereof, the plurality of amino groups can react with multiple pendant amine capture groups of Formula I. Thus, a polymeric material with a plurality of amine capture groups can have more than one pendant group attached to a single amino-containing material. Similarly, a polymeric material with multiple amine capture groups can be reacted with multiple amino-containing materials. These amino-containing materials can have a single or multiple amino groups.

In some embodiments, only a portion of the pendant amine capture groups of a polymeric material are reacted with an amino-containing material. That is, there is an excess of pendant amine capture groups that contain a fluoroalkoxycarbonyl group. An excess of the pendant amine capture groups can be desirable and tends to favor the capture of any amino-containing materials that may be present. Like the polymeric material prior to reacting with an amino-containing material, the partially reacted polymeric material can be linear or crosslinked.

More specifically, the partially reacted polymeric material includes a mixture of pendant groups that include (a) a first pendant amine capture group of Formula I

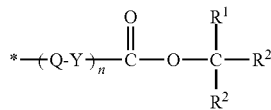

containing a fluoroalkoxycarbonyl group and (b) a carbonylimino-containing pendant group of Formula III.

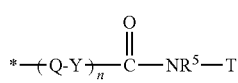

The carbonylimino-containing pendant group is the reaction product of a second pendant amine capture group of Formula I with a primary amino-containing material or a secondary amino-containing material. Variable n and groups Q, Y, R¹, R², R⁵, and T are the same as previously defined.

The pendant fluoroalkoxycarbonyl group according to Formula I usually has improved hydrolytic stability compared to a derivative of N-hydroxysuccinimide, which is a group known to react with amino-containing materials. Because of the improved hydrolytic stability of the pendant amine capture group of Formula I, the polymeric materials typically can be used in aqueous systems. The rate of reaction of amino-containing materials with the fluoroalkoxycarbonyl group of the pendant amine capture group of Formula I is typically faster than the rate of hydrolysis of the fluoroalkoxycarbonyl group. That is, connection of the amino-containing material occurs at a faster rate than the hydrolysis reaction. The attached amino-containing material is not easily displaced due to the formation of a covalent carbonylimino bond.

The polymeric material with pendant amine capture groups of Formula I can be disposed on a substrate. When the polymeric material is disposed on a substrate and an amino-containing material is attached to the polymeric material by reacting with the pendant amine capture groups, the amino-containing material is immobilized on the substrate.

When the polymeric material is a linear, soluble polymer, the polymeric material is often prepared prior to disposition on the surface of the substrate. That is, the method of immobilizing an amino-containing material to a substrate includes providing a substrate and disposing a polymeric material on a surface of the substrate, wherein the polymeric material has a pendant amine capture group of Formula I

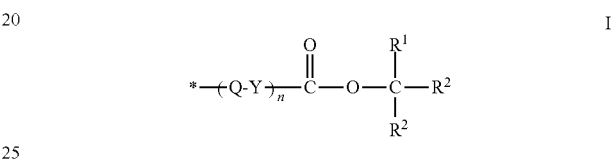

that include a fluoroalkoxycarbonyl group. The variable n and the groups Q, Y, R¹, and R² are the same as previously described. The method further includes reacting an amino-containing material with the fluoroalkoxycarbonyl group of the pendant amine capture group resulting in the connection of the amino-containing material to the polymeric material.

When the polymeric material is a crosslinked, insoluble polymer, the polymeric material is usually polymerized while in contact with a substrate. More specifically, the method of immobilizing an amino-containing material to a substrate includes providing a substrate and disposing a reaction mixture on a surface of the substrate. The reaction mixture contains (a) an amine capture monomer of Formula II

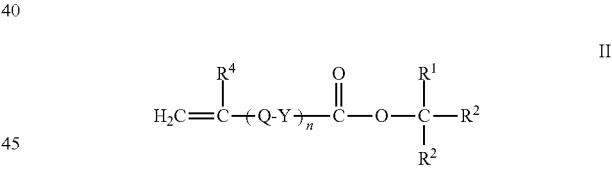

that includes a fluoroalkoxycarbonyl group and (b) a crosslinking monomer that includes at least two (meth)acryloyl groups. In Formula II, the variable n and groups Q, Y, R¹, R², and R⁴ are the same as previously described. The method further includes curing the reaction mixture to form a crosslinked polymeric material having a pendant amine capture group and reacting a primary or secondary amino-containing material with the fluoroalkoxycarbonyl group of the pendant amine capture group. This reaction results in the connection of the amino-containing material to the polymeric material by a nucleophilic substitution reaction.

The immobilization method can result in the formation of an article that includes a substrate and a partially reacted polymeric material disposed on a surface of the substrate. The partially reacted polymeric material includes a mixture of pendant groups that include (a) a first pendant fluoroalkoxycarbonyl group of Formula I and (b) a carbonylimino-containing pendant group of Formula III.

In some embodiments, the reaction mixture wets the surface of the substrate and the resulting crosslinked polymeric material adheres to the surface of the substrate. The crosslinked polymeric material adheres without the formation of a covalent bond between a reactive group on the polymer and a complementary group on the surface of the substrate. Rather, the polymer adheres by interlocking with surface imperfections on the substrate.

The crosslinked polymeric material can be patterned on the substrate. That is, the reaction mixture can be applied as a pattern on the surface of the substrate. The pattern can be in the form of text, design, image, or the like. For example, the pattern can be in the form of dots, squares, rectangles, circles, lines, or waves (e.g., square waves, sinusoidal waves, or sawtooth waves).

One method of forming a patterned crosslinked polymeric material includes disposing a pattern of the reaction mixture on the surface of the substrate by screen printing, jet printing (e.g., spray jet, valve jet, or ink jet printing), and the like. Useful devices for jet printing are described, for example, in U.S. Pat. No. 6,513,897 (Tokie) and in U.S. Pat. No. 6,883,908 B2 (Young et al.), the disclosure of which is incorporated herein by reference. After application of the pattern to the surface of the substrate, the reaction mixture can be cured. For example, the reaction mixture can be cured by application of heat if a thermal initiator is included in the reaction mixture or by application of actinic radiation if a photoinitiator is included in the reaction mixture.

Another method of forming a patterned crosslinked polymeric material includes forming a layer of the reaction mixture on the substrate, curing a first portion of the reaction mixture to form a pattern of crosslinked polymeric material on the substrate, and removing a second portion of the reaction mixture that is not cured. The layer of reaction mixture on the substrate can be prepared using any suitable technique such as, for example, brush coating, spray coating, gravure coating, transfer roll coating, knife coating, curtain coating, wire coating, and doctor blade coating.

One method of polymerizing a portion of the reaction mixture involves the use of a photoinitiator in the reaction mixture and the use of masks. The mask contains a pattern of openings and can be positioned between the layer of reaction mixture and the actinic radiation source. Actinic radiation can pass through the openings in the mask. Upon exposure to actinic radiation, a first portion of the reaction mixture layer corresponding to the openings in the mask can polymerize and a second portion of the reaction mixture layer that is blocked from the actinic radiation by the mask remains uncured or not reacted. That is, the uncured reaction mixture is a monomeric composition that has not gelled or hardened to form a crosslinked polymeric material. The uncured reaction mixture can be removed using a suitable solvent for the monomers of Formula II, the crosslinking monomers, and any optional diluent monomers. The solvent typically does not dissolve the cured crosslinked polymeric material because of the extensive crosslinking. Thus, the uncured reactive mixture can be removed leaving a pattern of crosslinked polymeric material on the substrate surface.

Suitable solvents for removing the unreacted reaction mixture include, but are not limited to, water, acetonitrile, tetrahydrofuran, ethyl acetate, toluene, acetone, methyl ethyl ketone, isopropanol, N-methylpyrrolidone, chlorinated and fluorinated hydrocarbons, fluorinated ethers, or combination thereof. The crosslinked polymeric material is typically insoluble in these solvents.

Suitable masks for this method of patterning include polymeric materials (e.g., polyesters such as polyethylene terephthalate or polyethylene naphthalate, polyimide, polycarbonate, or polystyrene), metal foil materials (e.g., stainless steel, other steels, aluminum, or copper), paper, woven or nonwoven fabric materials, or combination thereof. Polymeric masks and the openings in these masks are further described in U.S. Pat. No. 6,897,164 B2 (Baude et al.). The openings in the mask can be of any suitable dimension.

The substrates for immobilization of the amino-containing material can have any useful form including, but not limited to, films, sheets, membranes, filters, nonwoven or woven fibers, hollow or solid beads, bottles, plates, tubes, rods, pipes, and wafers. The substrates can be porous or non-porous, rigid or flexible, transparent or opaque, clear or colored, and reflective or non-reflective. The substrates can have a flat or relatively flat surface or can have a texture such as wells, indentations, channels, bumps, or the like. The substrates can have a single layer or multiple layers of material. Suitable substrate materials include, for example, polymeric materials, glasses, ceramics, metals, metal oxides, hydrated metal oxides, or combination thereof.

Suitable polymeric substrate materials include, but are not limited to, polyolefins (e.g., polyethylene and polypropylene), polystyrenes, polyacrylates, polymethacrylates, polyacrylonitriles, polyvinyl acetates, polyvinyl alcohols, polyvinyl chlorides, polyoxymethylenes, polycarbonates, polyamides, polyimides, polyurethanes, phenolics, polyamines, amino-epoxy resins, polyesters, silicones, cellulose based polymers, polysaccharides, or combination thereof.

Suitable glass and ceramic substrate materials can include, for example, silicon, aluminum, lead, boron, phosphorous, zirconium, magnesium, calcium, arsenic, gallium, titanium, copper, or combination thereof. Glasses typically include various types of silicate containing materials.

In some embodiments, the substrate includes a layer of diamond-like glass as disclosed in U.S. Pat. No. 6,696,157 B1 (David et al.), the disclosure of which is incorporated herein by reference in its entirety. The diamond-like glass is an amorphous material that includes carbon, silicon, and one or more elements selected from hydrogen, oxygen, fluorine, sulfur, titanium, or copper. Some diamond-like glass materials are formed from a tetramethysilane precursor using a plasma process. A hydrophobic material can be produced that is further treated in an oxygen plasma to control the silanol concentration on the surface.

Suitable metal-containing materials such as metals, metal oxides, or hydrated metal oxides for substrates can contain, for example, gold, silver, platinum, palladium, aluminum, copper, chromium, iron, cobalt, nickel, zinc, and the like. The metal-containing material can be an alloy such as stainless steel, indium tin oxide, and the like. In some embodiments, the metal-containing material is the top layer of a multilayer substrate. For example, the substrate can have a polymeric second layer and a metal-containing first layer. In one example, the second layer is a polymeric film and the first layer is a thin film of gold. In other examples, a multilayer substrate includes a polymeric film coated with a titanium-containing layer and then coated with a gold-containing layer. The titanium layer in such a construction can function as a tie layer or a primer layer for adhering the layer of gold to the polymeric film. In other examples of a multilayer substrate, a silicon support layer is covered with a layer of chromium and then with a layer of gold. The chromium layer can improve the adhesion of the gold layer to the silicon layer.

The polymeric material with pendant amine capture groups and the immobilized amino-containing materials can be used in a variety of applications. Immobilized biological amino-containing materials can be useful in the medical diagnosis of a disease or of a genetic defect. The immobilized amino-containing materials can also be used for biological separations or for detection of the presence of various biomolecules. Additionally, the immobilized amino-containing materials can be used in bioreactors or as biocatalysts to prepare other materials. The pendant amine capture group that includes a fluoroalkoxycarbonyl group can be used to detect amino-containing analytes that are not biological materials. The amino-containing analytes can have primary amine groups, secondary amine groups, or combination thereof.

Other materials can be further bound to the immobilized amino-containing material. This further bound material can be associated with the amino-containing material before immobilization of the amino-containing material or can be bound to the amino-containing material subsequent to immobilization of the amino-containing material. For example, the amino-containing material that is attached to the polymeric material can be a first biomolecule that is further bound to a second biomolecule. The amino-containing material and the further bound material can be complementary RNA fragments, complementary DNA fragments, an antigen-antibody combination, an immunoglobin-bacterium combination, and the like.

Biological amino-containing materials often can remain active after connection to the polymeric material (i.e., the pendant groups according to Formula III can include biologically active amino-containing materials). For example, an immobilized antibody can subsequently bind to an antigen or an immobilized antigen can subsequently bind to an antibody. Similarly an immobilized amino-containing biological material that has a portion that can bind to a bacterium can subsequently bind to the bacterium (e.g., an immobilized immunoglobulin can subsequently bind to a bacterium such as *Staphylococcus aureus*).

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| THF | Tetrahydrofuran |
| GLC | Gas Liquid Chromatography |
| TMPTA | Trimethylolpropane triacrylate |
| Photo-initiator | IRGACURE 1173 Photo curing agent 1-phenyl-2-hydroxy-2-methyl-1-propanone, available from Ciba; Hawthorne, NJ |
| PET | Primed polyester film of polyethylene terephthalate, 38 micrometers thick |
| HFE 7200 | Hydrofluoroether available from 3 M; Saint Paul, MN |
| Thermal Initiator | VAZO 67 thermal curing agent that is an azo compound NCC(CH$_3$)(C$_2$H$_5$)N=NC(CH$_3$)(C$_2$H$_5$)CN, available from DuPont; Wilmington, DE |

Preparative Example 1

Preparation of Glutaryl Chloride Mono-Methacryloxyethyl Ester

A solution of 2-hydroxyethyl methacrylate (57.0 grams), glutaric anhydride (50.0 grams) and phenothiazine (0.15 gram) in dry THF (250 milliliters) was cooled In a glass reaction vessel within an ice/water bath. Triethylamine (46.0 grams in 10 milliliters of THF) was added dropwise to this stirred mixture. The mixture was allowed to warm to room temperature and stirred for 2 days. The solution was concentrated using a rotary evaporator and the remaining mixture was dissolved in CH$_2$Cl$_2$ (250 milliliters). This solution was washed twice with 150 milliliters of 5% HCl solution and twice with 100 milliliters of water. After washing, the solution was dried over MgSO$_4$, and the solvent was removed with a rotary evaporator to yield 105.4 grams of a pink liquid of glutaric acid mono-methacryloxyethyl ester. A sample of this glutaric acid mono-methacryloxyethyl ester (50.0 grams) was dissolved in CH$_2$Cl$_2$ (100 milliliters). To this was added phenothiazine (0.05 gram) and then 5-10 milliliter portions thionyl chloride (25 milliliters). The reaction flask cooled markedly as HCl evolved. The reaction mixture was allowed to stir overnight and the solvent was removed using a rotary evaporator to yield 52.0 grams of a pink liquid of glutaryl chloride mono-methacryloxyethyl ester.

Preparative Example 2

Preparation of Hexafluoro-Iso-Propyl Ester of Glutaryl Chloride Mono-Methacryloxyethyl Ester Hexafluoro-iso-propanol (8.6 grams), CH$_2$Cl$_2$ (50 milliliters), and ethyl di-isopropyl amine (5.4 grams) were added slowly over several minutes to a stirred mixture of the acid chloride from Preparative Example 1 (10.5 grams). The resulting mixture was stirred for 2 hours and volatiles were removed using a rotary evaporator. The residue was dissolved in methyl tertiary-butyl ether and filtered through a microfilter. The solvent was removed using a rotary evaporator to give 9.0 grams of oil. The oil was dissolved in hexane (20 milliliters) and filtered through a microfilter. The solvent was removed using a rotary evaporator to give 8.5 grams of a clear, pale tan liquid. The identity of the product was confirmed by proton and fluorine NMR.

Preparative Example 3

Preparation of Nonafluoro-Tert-Butyl Ester of Glutaryl Chloride Mono-Methacryloxyethyl Ester Nonafluoro-tert-butanol (4.7 grams), phenothiazine (0.007 gram), CH$_2$Cl$_2$ (25 milliliters), and ethyl di-isopropyl amine (3.0 grams) were added slowly over several minutes to a stirred mixture of the acid chloride from Preparative Example 1 (6.0 grams). The resulting mixture was stirred overnight. An additional 25 milliliters of CH$_2$Cl$_2$ was added and the resulting mixture was washed with water (200 milliliters), 3% HCl solution (50 milliliters), and water (50 milliliters). After washing, the mixture was dried over MgSO$_4$. The solvent was removed on a rotary evaporator to give 7.7 grams of a clear, pale tan liquid. The identity of the product was confirmed by proton and fluorine NMR.

Preparative Example 4

Preparation of Heptafluoro-Iso-Propyl Acrylate

This preparation was essentially the same as described by A. G. Pittman et. al., *J Polymer Science A*-1, 4, 2637 (1966).

A mixture of dry KF (19.2 grams) and dry diglyme (250 milliliters) was added to a reaction vessel equipped with a paddle stirrer, gas inlet, and dry ice condenser. The mixture was cooled to −20° C. with a cooling bath and hexafluoro acetone was added as a gas. The cooling bath was removed and the mixture was warmed to 20° C. over 2 hours and then 26 milliliters of acryloyl chloride was added over 10 minutes. The resulting mixture was stirred 3 hours. Water was added and the resulting lower organic layer was rewashed with water and dried over $MgSO_4$. The organic layer (57.7 grams) was distilled to 22.9 grams of material having a boiling point was 84° C.

Preparative Example 5

Preparation of Heptafluoro-Iso-Propyl Ester of Glutaryl Chloride Mono-Methacryloxyethyl Ester A mixture of dry KF (6.3 grams) and dry diglyme (100 milliliters) was cooled to −20° C. in a cooling bath and hexafluoro acetone (16.0 grams) was added as a gas. The cooling bath was removed. When the temperature reached 5° C. (about 1 hour), the acid chloride from Preparative Example 1 (20.0 grams) was added slowly over 10 minutes. The resulting mixture was stirred for 3 hours at room temperature and quenched with water. The resulting lower organic layer was dissolved in $CH_2Cl_2$ (25 milliliters), washed with water, and dried over $MgSO_4$. GLC of the resulting solution indicated the desired ester as the major component.

Example 1

A 10% by weight fluorocarbon solution was prepared by mixing 1.00 grams of the ester prepared in Preparative Example 2, 9.00 grams TMPTA, and 40.0 grams of ethyl acetate. A 5% by weight fluorocarbon solution was prepared by mixing 20.0 grams of the 10% by weight solution with 4.0 grams TMPTA and 16.0 grams ethyl acetate. A 2.5% by weight fluorocarbon solution was prepared by mixing 20.0 grams of the 5% by weight solution with 4.0 grams TMPTA and 16.0 grams ethyl acetate. To each of these solutions (10%, 5% and 2.5%) was added 2 drops of Photoinitiator. The resulting solutions were coated onto PET film using a Number 28 Mayer rod, allowed to air dry for 30 minutes and passed through a UV processor (Fusion UV Systems, Gaithersburg Md., Model MC-6RQN, H-bulb) to give cured films.

Example 2

A 10% by weight fluorocarbon solution was prepared by mixing 1.00 grams of the ester prepared in Preparative Example 3, 9.00 grams TMPTA and 40.0 grams of ethyl acetate. A 5% by weight fluorocarbon solution was prepared by mixing 20.0 grams of the 10% by weight solution with 4.0 grams TMPTA and 16.0 grams ethyl acetate. A 2.5% by weight fluorocarbon solution was prepared by mixing 20.0 grams of the 5% by weight solution with 4.0 grams TMPTA and 16.0 grams ethyl acetate. To each of these solutions (10%, 5% and 2.5%) was added 2 drops of Photoinitiator. The resulting solutions were coated onto PET film using a Number 28 Mayer rod, allowed to air dry for 30 minutes and passed through a UV processor (Fusion UV Systems, Gaithersburg Md., Model MC-6RQN, H-bulb) to give cured films.

Example 3

A 10% by weight fluorocarbon solution was prepared by mixing 1.00 grams of the ester prepared in Preparative Example 4, 9.00 grams TMPTA and 40.0 grams of ethyl acetate. A 5% by weight fluorocarbon solution was prepared by mixing 20.0 grams of the 10% by weight solution with 4.0 grams TMPTA and 16.0 grams ethyl acetate. A 2.5% by weight fluorocarbon solution was prepared by mixing 20.0 grams of the 5% by weight solution with 4.0 grams TMPTA and 16.0 grams ethyl acetate. To each of these solutions (10%, 5% and 2.5%) was added 2 drops of Photoinitiator. The resulting solutions were coated onto PET film using a Number 28 Mayer rod, allowed to air dry for 30 minutes and passed through a UV processor (Fusion UV Systems, Gaithersburg Md., Model MC-6RQN, H-bulb) to give cured films.

Example 4

Homopolymer of Heptafluoroisopropyl Acrylate

A 4 ounce polymerization bottle was charged with 5.0 grams of the ester of Preparative Example 4, 20 grams HFE 7200, and 50 milligrams Thermal Initiator. The solution was purged with 1 liter per minute $N_2$ for 1 minute and the sealed bottle was heated in a rotating water bath for 24 hours at 60° C. The resulting polymer was a slightly tacky resin.

Example 5

Copolymer of Heptafluoroisopropyl Acrylate and Butyl Methacrylate

A 4 ounce bottle was charged with 5.0 grams of the ester of Preparative Example 4, 5.0 grams butyl methacrylate, 30.0 grams ethyl acetate, and 104 milligrams Thermal Initiator. The contents were purged with 1 liter per minute $N_2$ and heated for 24 hours at 60° C. in a rotating water bath. The copolymer was a clear, colorless resin that was not tacky.

Example 6

Copolymer of Preparative Example 2 and Butyl Methacrylate

A 4 ounce bottle was charge with 3.0 grams of the ester of Preparative Example 2, 7.0 grams butyl methacrylate, 30 grams ethyl acetate, and 102 milligrams Thermal Initiator. The contents were purged with 1 liter per minute $N_2$ for 1 minute and heated for 24 hours in a rotating water bath at 60° C. The copolymer was a clear, colorless resin that was not tacky.

We claim:

1. A method of connecting an amino-containing material to a polymeric material, the method comprising:
   providing a polymeric material that is polymerized product of a reaction mixture comprising a plurality of monomers consisting essentially of
   (a) an amine capture monomer of Formula IIb

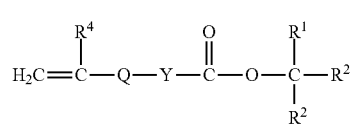

wherein
   Q is a carbonyloxy or carbonylimino;
   Y is a divalent group comprising an alkylene, heteroalkylene, arylene, or combination thereof and optionally further comprising a carbonyl, carbonyloxy, carbonylimino, oxy, —$NR^3$—, or combination thereof;

$R^1$ is hydrogen, fluoro, alkyl, or lower fluoroalkyl;

$R^2$ is a lower fluoroalkyl;

$R^3$ is hydrogen, alkyl, aryl, or aralkyl;

$R^4$ is hydrogen or alkyl; and (b) a co-monomer that is (i) an alkyl (meth)acrylate, (ii) a crosslinking monomer having at least two (meth)acryloyl groups, or (iii) a combination thereof; and reacting (1) a primary or secondary amino-containing material and (2) a fluoroalkoxycarbonyl group of the polymeric material resulting in connection of the amino-containing material to the polymeric material.

2. The method of claim 1, wherein the polymeric material is crosslinked.

3. The method of claim 1, wherein the co-monomer comprises a crosslinking monomer comprising at least two (meth)acryloyl groups.

4. The method of claim 1, wherein each $R^2$ is independently selected from —$CHF_2$ or —$CF_3$.

5. The method of claim 4, wherein $R^1$ is hydrogen, fluoro —$CHF_2$, or —$CF_3$.

6. The method of claim 1, wherein Y is an alkylene or Y comprises a first alkylene connected to at least one other group selected from a heteroalkylene, arylene, second alkylene, carbonyl, carbonyloxy, carbonylimino, oxy, thio, —$NR^3$—, or combination thereof.

7. The method of claim 1, where Y is a heteroalkylene or Y comprises a first heteroalkylene connected to at least one other group selected from an alkylene, arylene, second heteroalkylene, carbonyl, carbonyloxy, carbonylimino, oxy, thio, —$NR^3$—, or combination thereof.

8. The method of claim 1, wherein the amine capture monomer is of Formula IIc, IId, or IIe

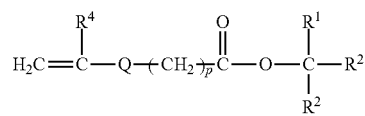

IIc

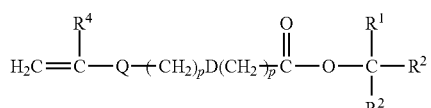

IId

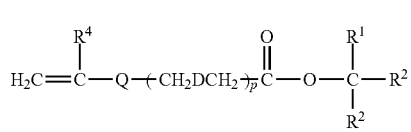

IIe wherein p is an integer of 1 to 20; and

D is oxy, thio, or —NH—.

9. The method of claim 1, wherein the amine capture monomer is of Formula IIf, IIg, or IIh

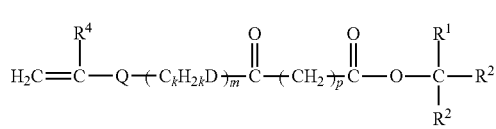

IIf

-continued

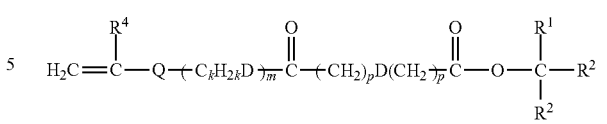

IIg

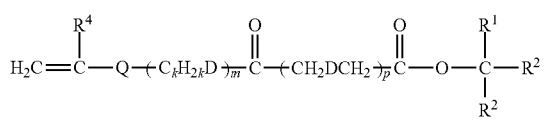

IIh wherein

D is oxy, thio, or —NH—;

m is an integer of 1 to 15;

k is an integer of 2 to 4; and p is an integer of 1 to 20.

10. The method of claim 1, wherein the amino-containing material comprises a biomolecule.

11. The method of claim 1, wherein the amino-containing material comprises a first biomolecule bonded to a second biomolecule.

12. A method of immobilizing an amino-containing material to a substrate, the method comprising:

providing a substrate;

disposing a polymeric material on a surface of the substrate, wherein the polymeric material is polymerized product of a reaction mixture comprising a plurality of monomers consisting essentially of (a) an amine capture monomer of Formula IIb

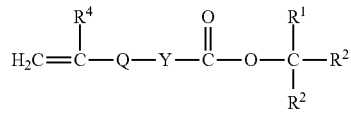

IIb wherein

Q is carbonyloxy or carbonylimino;

Y is a divalent group comprising an alkylene, heteroalkylene, arylene, or combination thereof and optionally further comprising a carbonyl, carbonyloxy, carbonylimino, oxy, —$NR^3$—, or combination thereof;

$R^1$ is hydrogen, fluoro, alkyl, or lower fluoroalkyl;

$R^2$ is a lower fluoroalkyl;

$R^3$ is hydrogen, alkyl, aryl, or aralkyl;

$R^4$ is hydrogen or alkyl; and (b) a co-monomer that is an alkyl (meth)acrylate, a crosslinking monomer having at least two (meth)acryloyl groups, or a combination thereof; and reacting (1) a primary or secondary amino-containing material and (2) a fluoroalkoxycarbonyl group of the polymeric material resulting in connection of the amino-containing material to the polymeric material.

13. The method of claim 12, wherein the amino-containing material comprises an amino-containing analyte, amino acid, DNA, RNA, protein, cell, tissue, organelle, immunoglobin, or fragment thereof.

14. A method of immobilizing an amino-containing material to a substrate, the method comprising providing a substrate;

disposing a reaction mixture on a surface of the substrate, the reaction mixture comprising a plurality of monomers consisting essentially of:

a) an amine capture monomer of Formula IIb

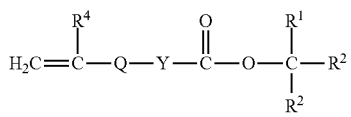

IIb wherein
Q is carbonyloxy or carbonylimino;
Y is a divalent group comprising an alkylene, heteroalkylene, arylene, or combination thereof and optionally further comprising a carbonyl, carbonyloxy, carbonylimino, oxy, —$NR^3$—, or combination thereof
$R^1$ is hydrogen, fluoro, alkyl, or lower fluoroalkyl;
$R^2$ is a lower fluoroalkyl;
$R^3$ is hydrogen, alkyl, aryl, or aralkyl;
$R^4$ is hydrogen or alkyl; and
b) a co-monomer that is an alkyl (meth)acrylate, a crosslinking monomer having at least two (meth)acryloyl groups, or a combination thereof;
curing the reaction mixture to form a crosslinked polymeric material comprising a pendant amine capture group comprising a fluoroalkoxycarbonyl group; and
reacting (1) a primary or secondary amino-containing material and (2) the fluoroalkoxycarbonyl group resulting in connection of the amino-containing material to the polymeric material.

15. The method of claim 14, wherein the amino-containing material comprises an amino-containing analyte, amino acid, DNA, RNA, protein, cell, tissue, organelle, immunoglobin, or fragment thereof.

16. A polymeric material comprising a product of a reaction mixture comprising a plurality of monomers consisting essentially of:
(a) an amine capture monomer of Formula IIb having a fluoroalkoxy carbonyl group

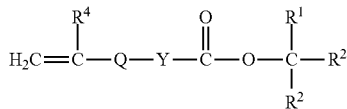

IIb wherein
Q is carbonyloxy or carbonylimino;
Y is a divalent group comprising an alkylene, heteroalkylene, arylene, or combination thereof and optionally further comprising a carbonyl, carbonyloxy, carbonylimino, oxy, —$NR^3$—, or combination thereof
$R^1$ is hydrogen, fluoro, alkyl, or lower fluoroalkyl;
$R^2$ is a lower fluoroalkyl;
$R^3$ is hydrogen, alkyl, aryl, or aralkyl;
$R^4$ is hydrogen or alkyl; and
(b) a co-monomer that is an alkyl (meth)acrylate, a crosslinking monomer having at least two (meth)acryloyl groups, or a combination thereof,
wherein some but not all of the fluoroalkoxycarbonyl groups of the polymeric material are reacted with a primary amino-containing material or a secondary amino-containing material to provide a carbonylamino-containing pendant group.

17. The polymeric material of claim 16, wherein the amino-containing material comprises an amino-containing analyte, amino acid, DNA, RNA, protein, cell, tissue, organelle, immunoglobin, or fragment thereof.

18. An article comprising:
a substrate; and
a polymeric material disposed on the substrate, the polymeric material comprising a product of a reaction mixture comprising a plurality of monomers consisting essentially of:
(a) an amine capture monomer of Formula IIb having a fluoroalkoxy carbonyl group

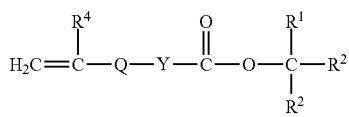

IIb wherein
Q is carbonyloxy or carbonylimino;
Y is a divalent group comprising an alkylene, heteroalkylene, arylene, or combination thereof and optionally further comprising a carbonyl, carbonyloxy, carbonylimino, oxy, $NR^3$—, or combination thereof;
$R^1$ is hydrogen, fluoro, alkyl, or lower fluoroalkyl;
$R^2$ is a lower fluoroalkyl;
$R^3$ is hydrogen, alkyl, aryl, or aralkyl;
$R^4$ is hydrogen or alkyl; and
a co-monomer that is an alkyl (meth)acrylate, a crosslinking monomer having at least two (meth)acryloyl groups, or a combination thereof,
wherein some but not all of the fluoroalkoxycarbonyl groups of the polymeric material are reacted with a primary amino-containing material or a secondary amino-containing material to provide a carbonylamino-containing pendant group.

* * * * *

UNITED STATES PATENT AND TRADEMARK OFFICE
CERTIFICATE OF CORRECTION

PATENT NO. : 8,357,540 B2
APPLICATION NO. : 11/856144
DATED : January 22, 2013
INVENTOR(S) : George G Moore Page 1 of 1

It is certified that error appears in the above-identified patent and that said Letters Patent is hereby corrected as shown below:

In the Specifications:
Column 19
Line 55 (Approx.), delete "3 M;" and insert -- 3M; --, therefor.

In the Claims:
Column 26
Line 24 (Approx.), in Claim 18, delete "fluoroalkoxy carbonyl" and insert -- fluoroalkoxycarbonyl --, therefor.

Line 38 (Approx.), in Claim 18, delete "$NR^3$—," and insert -- —$NR^3$—, --, therefor.

Signed and Sealed this
Seventh Day of May, 2013

Teresa Stanek Rea
*Acting Director of the United States Patent and Trademark Office*